(12) United States Patent
Nagashima

(10) Patent No.: US 9,115,806 B2
(45) Date of Patent: Aug. 25, 2015

(54) CONTROL DEVICE FOR AUTOMATIC TRANSMISSION

(75) Inventor: Fumitaka Nagashima, Fuji (JP)

(73) Assignees: JATCO LTD, Fuji-shi (JP); NISSAN MOTOR CO., LTD., Yokohama-shi (JP)

( * ) Notice: Subject to any disclaimer, the term of this patent is extended or adjusted under 35 U.S.C. 154(b) by 13 days.

(21) Appl. No.: 14/001,768

(22) PCT Filed: Jan. 31, 2012

(86) PCT No.: PCT/JP2012/052052
§ 371 (c)(1),
(2), (4) Date: Aug. 27, 2013

(87) PCT Pub. No.: WO2012/132534
PCT Pub. Date: Oct. 4, 2012

(65) Prior Publication Data
US 2013/0338890 A1    Dec. 19, 2013

(30) Foreign Application Priority Data
Mar. 25, 2011   (JP) .................................. 2011-067465

(51) Int. Cl.
*F16H 61/12* (2010.01)
*F16H 59/10* (2006.01)
(Continued)

(52) U.S. Cl.
CPC .............. *F16H 61/12* (2013.01); *F16H 59/105* (2013.01); *F16H 61/0021* (2013.01); *F16H 9/18* (2013.01); *F16H 61/66259* (2013.01); *F16H 2061/1284* (2013.01)

(58) Field of Classification Search
CPC   F16H 59/105; F16H 61/12; F16H 2061/1284
USPC ............................................. 701/58, 62, 63
See application file for complete search history.

(56) References Cited

U.S. PATENT DOCUMENTS 6,086,513 A * 7/2000 Tominaga ...................... 477/169
6,376,929 B1 * 4/2002 Nakajima ..................... 307/10.1
(Continued)

FOREIGN PATENT DOCUMENTS

JP    06-147316 A      5/1994
JP    2002130460 A *   5/2002 .............. F16H 61/12
(Continued)

OTHER PUBLICATIONS

JPO machine translation of JP 2004-251327 (original JP document published Sep. 9, 2004).*

*Primary Examiner* — Behrang Badii
*Assistant Examiner* — David Testardi
(74) *Attorney, Agent, or Firm* — Foley & Lardner LLP

(57) ABSTRACT

A first hydraulic pressure control unit forms an oil path to supply oil to a frictional engagement element when a select lever is located in a travel range or between the travel range and a non-travel range and forms an oil path to discharge the oil from the frictional engagement element when the select lever is located in the non-travel range. An abnormality determination unit cancels an abnormality determination when only a travel range signal is output from a range signal output unit after a signal of the range signal output unit is determined to be abnormal, and maintains the abnormality determination when only a non-travel range signal is output from the range signal output unit. A second hydraulic pressure control unit forms an oil path to supply the oil to the frictional engagement element during the abnormality determination or when only the travel range signal is output, and forms an oil path to discharge the oil from the frictional engagement element before the abnormality determination or when only the non-travel range signal is output.

3 Claims, 3 Drawing Sheets

(51) Int. Cl.
*F16H 61/00* (2006.01)
*F16H 61/662* (2006.01)
*F16H 9/18* (2006.01)

(56) References Cited

U.S. PATENT DOCUMENTS

| | | | | |
|---|---|---|---|---|
| 6,960,153 | B2* | 11/2005 | Ochiai et al. | 477/107 |
| 6,984,191 | B2* | 1/2006 | Kuwata et al. | 477/97 |
| 7,203,587 | B2* | 4/2007 | Tamaru et al. | 701/64 |
| 7,247,121 | B2* | 7/2007 | Takagi | 477/34 |
| 7,412,907 | B2* | 8/2008 | Oohori et al. | 74/335 |
| 7,584,681 | B2* | 9/2009 | Kozaki et al. | 74/335 |
| 7,803,081 | B2 | 9/2010 | Watanabe et al. | |
| 7,835,833 | B2* | 11/2010 | Mizutani | 701/31.7 |
| 8,044,787 | B2* | 10/2011 | Katrak et al. | 340/456 |
| 8,204,712 | B2* | 6/2012 | Katrak | 702/150 |
| 2005/0126322 | A1* | 6/2005 | Kozaki et al. | 74/335 |
| 2006/0075839 | A1 | 4/2006 | Oohori et al. | |
| 2006/0240945 | A1 | 10/2006 | Tanaka et al. | |
| 2008/0076632 | A1 | 3/2008 | Watanabe et al. | |
| 2009/0062064 | A1* | 3/2009 | Kamada et al. | 477/34 |
| 2009/0204282 | A1 | 8/2009 | Mizutani | |
| 2010/0294065 | A1* | 11/2010 | Funakoshi et al. | 74/473.11 |
| 2011/0010064 | A1 | 1/2011 | Funakoshi et al. | |

FOREIGN PATENT DOCUMENTS

| | | | | |
|---|---|---|---|---|
| JP | 2003294134 A | * | 10/2003 | F16H 61/18 |
| JP | 2004-116605 A | | 4/2004 | |
| JP | 2004251327 A | * | 9/2004 | F16H 61/12 |
| JP | 2005-344805 A | | 12/2005 | |
| JP | 2006-105319 A | | 4/2006 | |
| JP | 2006-300027 A | | 11/2006 | |
| JP | 2008-075853 A | | 4/2008 | |
| WO | WO 2010/110098 A1 | | 9/2010 | |

* cited by examiner

CONTROL DEVICE FOR AUTOMATIC TRANSMISSION

TECHNICAL FIELD

The present invention relates to a control device for automatic transmission.

BACKGROUND ART

Conventionally, a control device including an inhibitor switch in which a part of a region where D-range signal is output and a part of a region where N-range signal is output overlap is disclosed in JP6-147316A.

SUMMARY OF INVENTION

In the above invention, when a select lever is operated, for example, from N-range to D-range, the inhibitor switch outputs an N-range signal and a D-range signal at an intermediate position between N-range and D-range. After the operation amount of the select lever increases and the select lever is set to D-range, the inhibitor switch outputs only the D-range and a shift control corresponding to this is executed.

If an N-range signal contact of the inhibitor switch is shorted, an N-range signal is constantly output from the inhibitor switch. Thus, even if the select lever is located in D-range, the inhibitor switch outputs a D-range signal and an N-range signal.

In the above invention, in such a case, there is a problem that a shift control cannot be properly executed in accordance with an output signal from the inhibitor switch and vehicle running performance is deteriorated.

The present invention was developed to solve such a problem and aims not to deteriorate vehicle running performance when a signal from an inhibitor switch is abnormal.

A control device for automatic transmission according to one aspect of the present invention is a control device for automatic transmission for controlling an automatic transmission including a frictional engagement element adapted to transmit rotation by being engaged by the supply of oil and cut off the transmission of the rotation by being released by the discharge of the oil. The control device for automatic transmission includes a first hydraulic pressure control unit adapted to be mechanically coupled to a select lever and supply and discharge the oil to and from the frictional engagement element according to an operation position of the select lever, a range signal output unit adapted to output a range signal corresponding to the operation position of the select lever, an abnormality determination unit adapted to determine an abnormality of the range signal output unit based on the range signal, and a second hydraulic pressure control unit adapted to be arranged in series with the first hydraulic pressure control unit and supply and discharge the oil to and from the frictional engagement element in accordance with the range signal. The first hydraulic pressure control unit forms an oil path enabling the supply of the oil to the frictional engagement element when the select lever is located in a travel range or between the travel range and a non-travel range adjacent to the travel range and forms an oil path to discharge the oil from the frictional engagement element when the select lever is located in the non-travel range. The abnormality determination unit determines that a signal output from the range signal output unit is abnormal when a signal corresponding to an intermediate position between the travel range and the non-travel range is continuously output from the range signal output unit for an abnormality determination time, cancels the abnormality determination when only a travel range signal is output from the range signal output unit after the abnormality is determined, and maintains the abnormality determination when only a non-travel range signal is output from the range signal output unit after the abnormality is determined. The second hydraulic pressure control unit forms an oil path enabling the supply of the oil to the frictional engagement element when the abnormality is determined by the abnormality determination unit or when only the travel range signal is output and forms an oil path to discharge the oil from the frictional engagement element when a time during which the signal corresponding to the intermediate position between the travel range and the non-travel range is output is shorter than the abnormality determination time or when only the non-travel range signal is output.

According to this aspect, vehicle travel performance can be improved also when a signal from an inhibitor switch is abnormal.

DESCRIPTION OF EMBODIMENTS

Hereinafter, an embodiment of the present invention is described with reference to the drawings.

Figure 1:
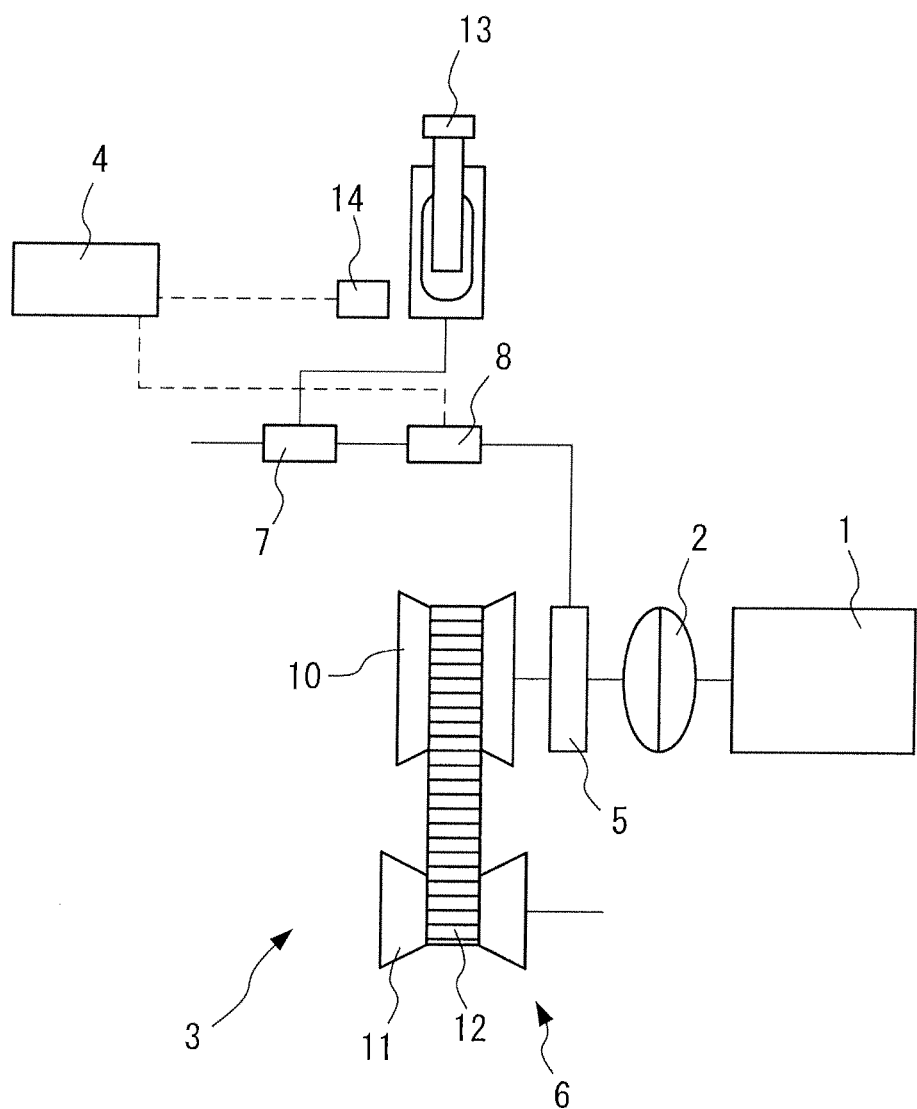
FIG. 1 is a schematic configuration diagram of a vehicle including a control device for automatic transmission of the present embodiment.

FIG. 1 is a schematic configuration diagram of a vehicle including a control device for automatic transmission of the present embodiment.

The vehicle includes an engine 1, a torque converter 2, a continuously variable transmission 3 and a controller 4.

The continuously variable transmission 3 includes a forward/reverse switching mechanism 5, a variator 6, a manual valve 7 and a solenoid 8.

The forward/reverse switching mechanism 5 switches an engaged state of a forward clutch or a reverse clutch by oil supplied and discharged via the manual valve 7 and the solenoid 8.

The variator 6 includes a primary pulley 10, a secondary pulley 11 and a belt 12 mounted on the primary pulley 10 and the secondary pulley 11.

Rotation generated by the engine 1 is transmitted successively to the torque converter 2, the continuously variable transmission 3 and drive wheels (not shown), whereby the vehicle runs.

The manual valve 7 is mechanically coupled to the select lever 13 and supplies and discharges oil to and from the forward/reverse switching mechanism 5 by forming oil paths based on the operation of the select lever 13. The manual valve 7 forms an oil path to supply the oil to the forward/reverse switching mechanism 5 when the select lever 13 is in a travel range (D-range or R-range) or at an intermediate position between the travel range and a non-travel range (N-range or P-range) adjacent to the travel range. The manual valve 7 forms an oil path to discharge the oil from the forward/reverse switching mechanism 5 when the select lever 13 is in the non-travel range.

The solenoid 8 forms oil paths to supply and discharge oil to and from the forward/reverse switching mechanism 5 based on a signal output from the inhibitor switch 14. The solenoid 8 is arranged in series with the manual valve 7. A series arrangement means an arrangement of the manual valve 7 and the solenoid 8 along an oil flowing direction in the case of supplying the oil to the forward/reverse switching mechanism 5. Thus, when the manual valve 7 forms the oil path to supply the oil to the forward/reverse switching mechanism 5 and, further, the solenoid 8 forms the oil path to supply the oil to the forward/reverse switching mechanism 5, the oil is supplied to the forward/reverse switching mechanism 5 via the manual valve 7 and the solenoid 8. On the other hand, even if either one of the manual valve 7 and the solenoid 8 forms the oil path to supply the oil to the forward/reverse switching mechanism 5, the oil is discharged from the forward/reverse switching mechanism 5 if the other forms the oil path to discharge the oil from the forward/reverse switching mechanism 5.

The inhibitor switch 14 outputs a range signal according to the position of the select lever 13. For example, the inhibitor switch 14 outputs a D-range signal when the select lever 13 is detent-locked in a position to set D-range.

Further, when the select lever 13 is located in an intermediate position between the travel range and the non-travel range adjacent to the travel range, i.e. located between a detent position of the travel range and a detent position of the non-travel range, the inhibitor switch 14 outputs a travel range signal and a non-travel range signal as signals corresponding to the intermediate position. For example, when the select lever 13 is operated from N-range to D-range, the inhibitor switch 14 outputs an N-range signal and a D-range signal from a detent position where the select lever 13 is in N-range to a detent position where the select lever 13 is in D-range.

Further, the inhibitor switch 14 outputs signals corresponding to the intermediate position also when a contact for outputting each range signal is shorted. For example, in the case a contact for N-range is shorted when the select lever 13 is located in D-range, the inhibitor switch 14 outputs the signals.

The controller 4 is composed of a CPU, a ROM, a RAM and the like. The function of the continuously variable transmission 3 is fulfilled by the CPU reading a program stored in the ROM.

The controller 4 controls the solenoid 8 based on a signal of the inhibitor switch 14 to supply and discharge the oil to and from the forward/reverse switching mechanism 5.

Figure 2:
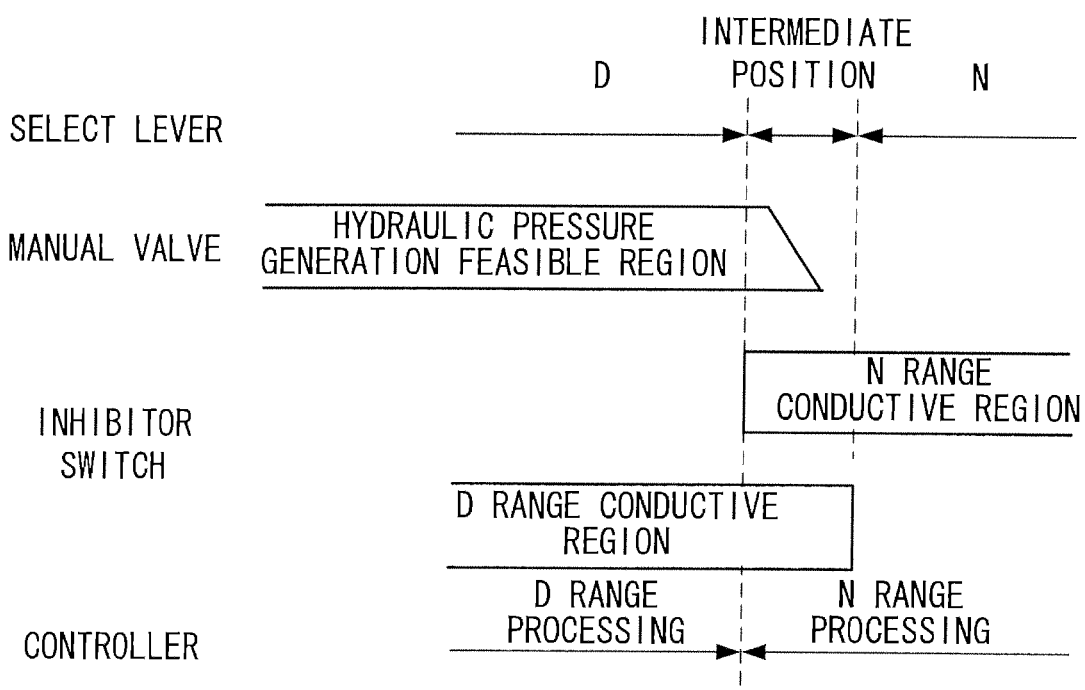
FIG. 2 is a chart showing a hydraulic pressure generation feasible region of a manual valve by an operation of a select lever and conductive regions of an inhibitor switch.

Here, the supply and discharge of the oil to and from the forward/reverse switching mechanism 5 are described using FIG. 2, a case where the select lever 13 is operated from N-range to D-range being taken as an example. FIG. 2 is a chart showing a hydraulic pressure generation feasible region of the manual valve 7 by the operation of the select lever 13 and conductive regions of the inhibitor switch 14. When being set in the hydraulic pressure generation feasible region, the manual valve 7 forms the oil path to supply the oil to the forward/reverse switching mechanism 5. The inhibitor switch 14 outputs a signal corresponding to the conductive region in each conductive region.

When the select lever 13 is detent-locked in N-range, the manual valve 7 forms an oil path to discharge the oil from the forward clutch. Further, the inhibitor switch 14 outputs only an N-range signal and the solenoid 8 forms an oil path to discharge the oil from the forward clutch.

When the select lever 13 is moving from the detent position of N-range to that of D-range, i.e. while the select lever 13 is moving through the intermediate position between N-range and D-range, the manual valve 7 forms an oil path to supply the oil to the forward clutch. It should be noted that the manual valve 7 is gradually opened to increase the amount of the oil suppliable to the forward clutch per unit time as the select lever 13 approaches the detent position of D-range. The inhibitor switch 14 outputs the N-range signal and the D-range signal. In this case, the controller 4 processes the signals from the inhibitor switch 14 as N-range signals and the solenoid 8 forms the oil path to discharge the oil from the forward clutch. Thus, no oil is supplied to the forward clutch and the forward clutch is released.

When the select lever 13 reaches the detent position of D-range, the inhibitor switch 14 outputs only the D-range signal and the solenoid 8 forms an oil path to gradually supply the oil to the forward clutch. In this way, the oil is gradually supplied to the forward clutch to engage the forward clutch.

Figure 3:
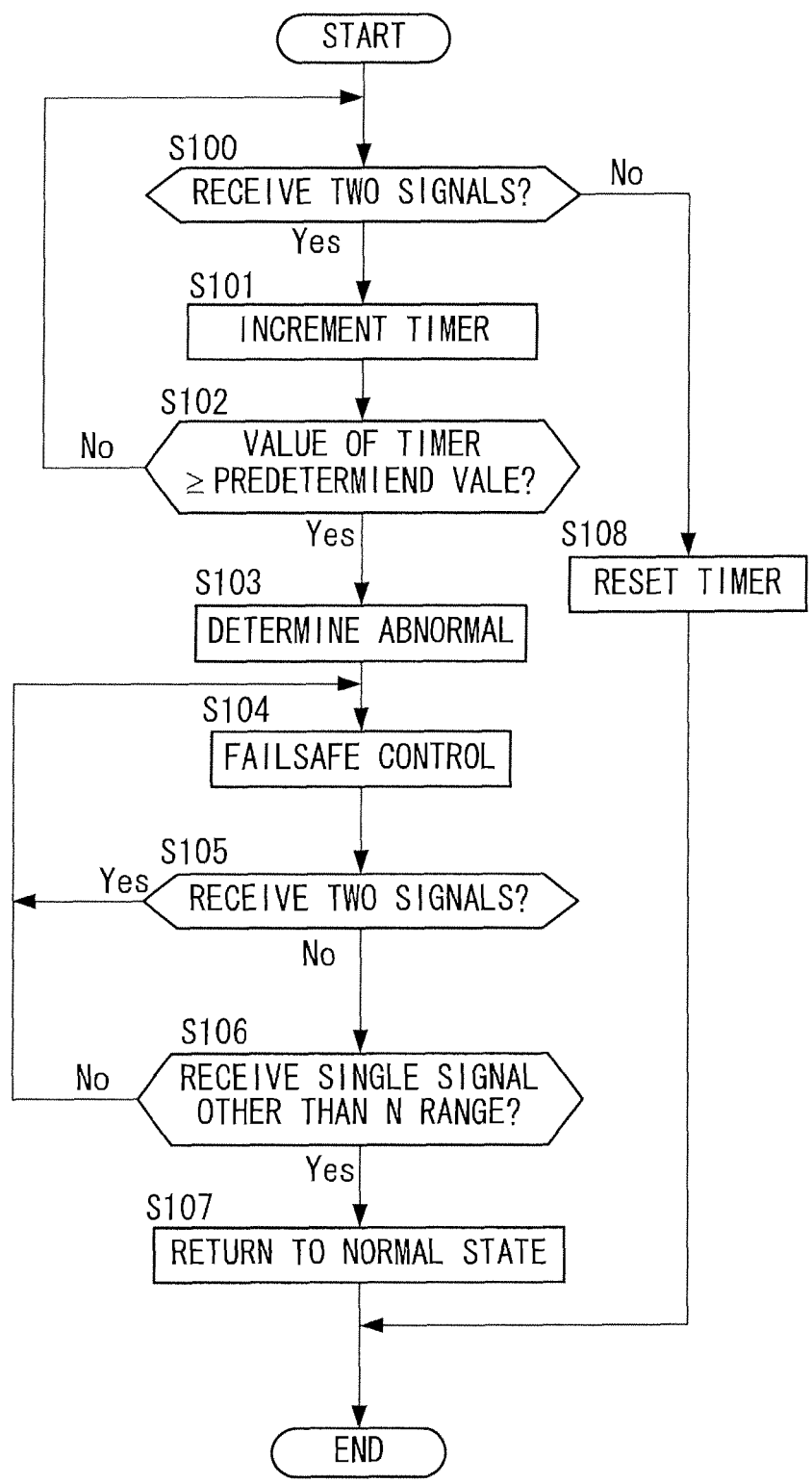
FIG. 3 is a flow chart showing an abnormality recovery control of the inhibitor switch in the present embodiment.

Next, an abnormality recovery control of the inhibitor switch in the present embodiment is described using a flow chart of FIG. 3.

In Step S100, the controller 4 determines whether or not it is receiving signals corresponding to the intermediate position from the inhibitor switch 14. Specifically, the controller 4 determines whether or not it is receiving two signals of a travel range signal and a non-travel range signal from the inhibitor switch 14. Although the travel range signal is described as a D-range signal and the non-travel range signal is described as an N-range signal here, a similar control is executed also when the travel range signal is an R-range signal. The controller 4 proceeds to Step S101 if it is receiving the two signals while proceeding to Step S108 if it is receiving either one of the signals or neither one of the signals.

In Step S101, the controller 4 increments a timer indicating the reception of the two signals. The controller 4 adds "1" to the last value. The initial value of the timer is "0".

In Step S102, the controller 4 compares the timer with a predetermined time. If the timer is smaller than the predetermined time, the controller 4 returns to Step S100 to repeat the above control. If the timer becomes not smaller than the predetermined time, the controller 4 proceeds to Step S103. The predetermined time is an abnormality determination time during which the inhibitor switch 14 or the select lever 13 can be determined to be abnormal, and set in advance. That the inhibitor switch 14 or the select lever 13 is abnormal means that the two signals of the travel range signal and the non-travel range signal are continuously output for a longer time than usual. For example, this is a case where a contact for outputting each range signal is shorted in the inhibitor switch 14 and the inhibitor switch 14 outputs a signal, which is supposed not to be output, or a case where an elbow or the like is in contact with the select lever 13 and the select lever 13 is held at a position (intermediate position between the ranges) where the select lever 13 is not supposed to be detent-locked.

In Step S103, the controller 4 determines that the signals from the inhibitor switch 14 are abnormal.

In Step S104, the controller 4 executes a failsafe control. Specifically, the controller 4 processes the signals of the inhibitor switch 14 as D-range signals. This causes the solenoid 8 to form the oil path to supply the oil to the forward clutch. In the case of executing the failsafe control, an engaged state of the forward clutch is changed depending on the operation position of the select lever 13. Since the manual valve 7 forms the oil path to supply the oil to the forward clutch when the operation position of the select lever 13 is in D-range or the intermediate position between D-range and N-range, the manual valve 7 can reliably form the oil path to supply the oil to the forward clutch, the forward clutch can be engaged and the vehicle can be caused to run if the operation position of the select lever 13 is in D-range. On the other hand, since the manual valve 7 forms the oil path to discharge the oil from the forward clutch if the operation position of the select lever 13 is in N-range, the forward clutch can be released and the vehicle can be stopped.

In Step S105, the controller 4 determines whether or not it is receiving two signals of the D-range signal and the N-range signal from the inhibitor switch 14. The controller 4 returns to Step S104 to repeat the above control if it is receiving the two signals from the inhibitor switch 14. The controller 4 proceeds to Step S106 if it is not receiving the two signals.

In Step S106, the controller 4 determines whether or not it is receiving the single N-range signal from the inhibitor switch 14. The controller 4 proceeds to Step S107 if it is receiving only the D-range signal, while returning to Step S104 to repeat the above control if it is receiving only the N-range signal.

In Step S107, the controller 4 stops the failsafe control, returns to a normal state and executes a control in accordance with the D-range signal received from the inhibitor switch 14.

In Step S108, the control 4 resets the value of the timer. If the two signals are output from the inhibitor switch 14 and the D-range or N-range signal is output within the predetermined time, the controller 4 determines the normal operation of the select lever 13.

Effects of the embodiment of the present invention are described.

If the D-range signal and the N-range signal are continuously output from the inhibitor switch 14 for the predetermined time or longer, the signals from the inhibitor switch 14 are determined to be abnormal and the failsafe control is executed before only the N-range signal is output from the inhibitor switch 14, the failsafe control is continued. This can prevent the failsafe control from being stopped although the select lever 13 is operated to N-range and the inhibitor switch 14 is broken down, for example, after the contact for N-range of the inhibitor switch 14 is shorted, the D-range signal and the N-range signal are continuously output from the inhibitor switch 14 for the predetermined time or longer and the failsafe control is started.

If the failsafe control is stopped in the above state and a select lever is operated from N-range to D-range without using the present embodiment, an N-range signal and a D-range signal are output from an inhibitor switch. However, since a solenoid supplies no oil to a forward clutch until the two signals are continuously output for a predetermined time, the vehicle cannot be caused to run during that time.

Since the failsafe control is continued in the present embodiment, the solenoid 8 forms the oil path to supply the oil to the forward clutch. Thus, the vehicle can be caused to quickly run and the deterioration of vehicle running performance can be suppressed.

Even if the N-range signal and the D-range signal are continuously output from the inhibitor switch 14 for the predetermined time or longer, when only the D-range signal is output from the inhibitor switch 14 thereafter, the failsafe control is stopped and a return to the normal state is made. This enables a return to the normal state to be made early, for example, if the select lever 13 is slowly operated.

It is assumed that an N-range signal and a D-range signal are processed as D-range signals and a solenoid forms an oil path to supply oil to a forward clutch without using the present embodiment when a select lever is located in an intermediate region between N-range and D-range, i.e. when an inhibitor switch outputs the N-range signal and the D-range signal. In this case, if a manual valve remains at a position where an oil path is not formed to supply the oil to the forward clutch, the oil is not supplied to the forward clutch even if the solenoid forms an oil path to gradually supply the oil to the forward clutch. Thereafter, if the oil path by the solenoid is completely opened before the manual valve moves to a position where an oil path is formed to supply the oil to the forward clutch, the oil may be suddenly supplied to the forward clutch and the forward clutch may be suddenly engaged.

In the present embodiment, the solenoid 8 forms the oil path to discharge the oil from the forward clutch if the select lever 13 is located at an intermediate position between N-range and D-range. After the select lever 13 is detent-locked in D-range, the solenoid 8 forms the oil path to supply the oil to the forward clutch based on a signal from the inhibitor switch 14, the oil is gradually supplied to the forward clutch and the hydraulic pressure of the forward clutch is gradually increased. Thus, sudden engagement of the forward clutch can be suppressed and a shock given to a driver can be reduced.

Although the embodiment of the present invention has been described above, the above embodiment is merely an application example of the present invention and not of the nature to limit the technical scope of the present invention to the specific configuration of the above embodiment.

Although the continuously variable transmission 3 has been described as an automatic transmission in the present embodiment, a stepped transmission may be used without being limited to this. Further, a frictional engagement element to and from which the oil is supplied and discharged by the manual valve 7 and the solenoid 8 is not limited to the forward/reverse switching mechanism 5, but may be a frictional engagement element to be engaged when the vehicle moves forward and the one to be engaged when the vehicle moves backward. Further, the failsafe control may be so executed as to establish a predetermined forward gear position.

Although the inhibitor switch 14 outputs a travel range signal and a non-travel range signal as signals corresponding to the intermediate position in the present embodiment, it may output a zero signal or another signal without being limited to this. The zero signal means a state where neither one of the range signals is output.

The present application claims a priority based on Japanese Patent Application No. 2011-67465 filed with the Japan Patent Office on Mar. 25, 2011, all the contents of which are hereby incorporated by reference.

The invention claimed is:

1. A control device for controlling an automatic transmission including a frictional engagement element adapted to transmit rotation by being engaged by a supply of oil and to cut off transmission of the rotation by being released by discharging the oil, comprising:

a first hydraulic pressure control unit structured to be mechanically coupled to a select lever and to supply and discharge oil to and from the frictional engagement element according to an operation position of the select lever;

a range signal output unit adapted to output a range signal corresponding to the operation position of the select lever;

an abnormality determination unit adapted to determine an abnormality of the range signal output unit based on the range signal; and a second hydraulic pressure control unit structured to be arranged in series with the first hydraulic pressure control unit and to supply and discharge the oil to and from the frictional engagement element in accordance with the range signal, the second hydraulic pressure control unit being disposed between the first hydraulic pressure control unit and the frictional engagement element;

wherein the first hydraulic pressure control unit forms an oil path enabling the supply of oil to the frictional engagement element when the select lever is located in a travel range or between the travel range and a non-travel range adjacent to the travel range and forms an oil path to discharge the oil from the frictional engagement element when the select lever is located in the non-travel range, the non-travel range being an N-range or a P-range;

wherein the abnormality determination unit determines that a signal output from the range signal output unit is abnormal when a signal corresponding to an intermediate position between the travel range and the non-travel range is continuously output from the range signal output unit for an abnormality determination time, cancels the abnormality determination when only a travel range signal is output from the range signal output unit after the abnormality is determined, and maintains the abnormality determination when only a non-travel range signal is output from the range signal output unit after the abnormality is determined; and wherein the second hydraulic pressure control unit forms an oil path enabling the supply of the oil to the frictional engagement element when the abnormality is determined by the abnormality determination unit or when only the travel range signal is output and forms an oil path to discharge the oil from the frictional engagement element when a time during which the signal corresponding to the intermediate position between the travel range and the non-travel range is output is shorter than the abnormality determination time or when only the non-travel range signal is output.

2. A control method for controlling an automatic transmission including a frictional engagement element adapted to transmit rotation by being engaged by a supply of oil and to cut off transmission of the rotation by being released by discharging the oil, a first hydraulic pressure control unit adapted to be mechanically coupled to a select lever and to form an oil path enabling the supply of oil to the frictional engagement element when the select lever is located in a travel range or between the travel range and a non-travel range adjacent to the travel range, and to form an oil path to discharge the oil from the frictional engagement element when the select lever is located in the non-travel range, and a second hydraulic pressure control unit adapted to be arranged in series with the first hydraulic pressure control unit and to supply and discharge the oil to and from the frictional engagement element in accordance with a range signal, the second hydraulic pressure control unit being disposed between the first hydraulic pressure control unit and the frictional engagement element, comprising:

outputting the range signal corresponding to an operation position of the select lever;

determining that the range signal is abnormal when a signal corresponding to an intermediate position between the travel range and the non-travel range is continuously output for an abnormality determination time, the non-travel range being an N-range or a P-range;

canceling an abnormality determination when only a travel range signal is output after an abnormality is determined;

maintaining the abnormality determination when only a non-travel range signal is output after the abnormality is determined;

forming an oil path enabling the supply of the oil to the frictional engagement element by controlling the second hydraulic pressure control unit when the abnormality is determined or when only the travel range signal is output; and forming an oil path to discharge the oil from the frictional engagement element by controlling the second hydraulic pressure control unit when a time during which the signal corresponding to the intermediate position between the travel range and the non-travel range is output is shorter than the abnormality determination time or when only the non-travel range signal is output.

3. A control device for controlling an automatic transmission including a frictional engagement element adapted to transmit rotation by being engaged by a supply of oil and to cut off transmission of the rotation by being released by discharging the oil, comprising:

a first hydraulic pressure means for mechanically coupling to a select lever and for supplying and discharging oil to and from the frictional engagement element according to an operation position of the select lever;

a range signal output means for outputting a range signal corresponding to the operation position of the select lever;

an abnormality determination means for determining an abnormality of the range signal output means based on the range signal; and a second hydraulic pressure means arranged in series with the first hydraulic pressure means for supplying and discharging the oil to and from the frictional engagement element in accordance with the range signal, the second hydraulic pressure means being disposed between the first hydraulic pressure means and the frictional engagement element;

wherein the first hydraulic pressure means forms an oil path enabling the supply of oil to the frictional engagement element when the select lever is located in a travel range or between the travel range and a non-travel range adjacent to the travel range and forms an oil path to discharge the oil from the frictional engagement element when the select lever is located in the non-travel range, the non-travel range being an N-range or a P-range;

wherein the abnormality determination means determines that a signal output from the range signal output means is abnormal when a signal corresponding to an intermediate position between the travel range and the non-travel range is continuously output from the range signal output means for an abnormality determination time, cancels the abnormality determination when only a travel range signal is output from the range signal output means after the abnormality is determined, and maintains the abnormality determination when only a non-travel range signal is output from the range signal output means after the abnormality is determined; and wherein the second hydraulic pressure means forms an oil path enabling the supply of the oil to the frictional engagement element when the abnormality is determined by the abnormality determination means or when only the travel range signal is output and forms an oil path to discharge the oil from the frictional engagement element when a time during which the signal corresponding to the intermediate position between the travel range and the non-travel range is output is shorter than the abnormality determination time or when only the non-travel range signal is output.

* * * * *